United States Patent
Ahn et al.

[11] Patent Number: 6,160,627
[45] Date of Patent: Dec. 12, 2000

[54] OPTICAL FIBER MACH-ZEHNDER INTERFEROMETER FILTER

[75] Inventors: Joon Tae Ahn; Hak Kyu Lee; Min Yong Jeon; Dong Sung Lim; Kyong Hon Kim; El Hang Lee, all of Taejon, Rep. of Korea

[73] Assignee: Electronics and Telecommunications Research Institute, Taejon, Rep. of Korea

[21] Appl. No.: 09/315,998

[22] Filed: May 21, 1999

[30] Foreign Application Priority Data

May 21, 1998 [KR] Rep. of Korea ............... 98-18366

[51] Int. Cl.⁷ .................................................. G01B 9/02
[52] U.S. Cl. ........................................... 356/477; 356/478
[58] Field of Search ........................... 356/345, 356, 356/349

[56] References Cited

U.S. PATENT DOCUMENTS

| | | |
|---|---|---|
| 4,572,949 | 2/1986 | Bowers et al. ............... 356/351 |
| 5,062,684 | 11/1991 | Clayton et al. . |
| 5,289,552 | 2/1994 | Miller et al. . |
| 5,295,205 | 3/1994 | Miller et al. . |

OTHER PUBLICATIONS

Eric Udd, Fiber Optic Sensors, 1991, pp. 280–285.

K. Inoue et al. "Tunable Optical Multi/Demultiplexer for Optical FDM Transmission System", Electronics Letters, Apr. 25, 1985, vol. 21, No. 9, pp. 387–389.

K. Okamoto et al., "All–Panda–Fibre Multi/Demultiplexer Utilising Polarisation Beat Phenomenon in Birefringent Fibres", Electronics Letters, Feb. 13, 1986, vol. 22, No. 4, pp. 181–182.

T. Morioka et al., "More Than 100–Wavelength–Channel Picosecond Optical Pulse Generation From Single Laser Source Using Supercontinuum In Optical Fibres", Electronics Letters, May 13, 1993, vol. 29, No. 10, pp. 862–864.

*Primary Examiner*—Robert Kim
*Attorney, Agent, or Firm*—Jacobson, Price, Holman & Stern, PLLC

[57] ABSTRACT

An optical fiber Mach-Zehnder interferometer optical filter is disclosed. The filter includes a stabilization light source for varying a first wavelength of a light signal for stabilizing a Mach-Zehnder interferometer, first and second optical fiber couplers for receiving an optical signal from the stabilization light source and an optical signal of a second wavelength different from a first wavelength inputted from an input port and dividing into two parts having the same intensity for thereby forming a Mach-Zehnder interferometer, a polarization controller connected with one side of the first optical fiber coupler for controlling a polarization of the interfered light of the interferometer, first and second wavelength division multiplex optical couplers connected with the second optical fiber coupler for separately outputting a first wavelength optical signal and a second wavelength optical signal, an optical fiber phase modulator connected with the other side of the first optical fiber coupler for varying the length of the optical fiber in accordance with a fed-back phase difference, and a stabilization circuit for receiving two optical signals of the first wavelength from the first and second wavelength division multiplex optical couplers and feeding back the phase difference to the optical fiber phase modulator for thereby implementing a constant optical path difference of the interferometer.

4 Claims, 2 Drawing Sheets

OPTICAL FIBER MACH-ZEHNDER INTERFEROMETER FILTER

BACKGROUND OF THE INVENTION

1. Field of the Invention

The present invention relates to an optical fiber Mach-Zehnder interferometer optical filter, and in particular to a multiwavelength transmission type optical filter, which is capable of controlling a transmission wavelength, using a stabilized optical fiber Mach-Zehnder interferometer.

2. Description of the Conventional Art

Recently, the wavelength division multiplex optical communication technique has a big attention as a terabit class optical communication technique. In this technique, a device such as an optical filter, an optical wavelength multiplexer, a demulfiplexer, etc. capable of controlling light in a wavelength domain is used as an important component. In view of this element, the AWG(Arrayed Waveguide Grating) disclosed in the end of 1980s has been used as a device capable of obtaining a desired performance as a wavelength division multiplex device.

In addition, methods in which an optical fiber interferometer having a transmission characteristic which periodically varies in accordance with a wavelength is used as a wavelength division multiplex device have been studied.

As a result of the above-described study, a multiwavelength transmission type optical filter using a Fabry-Perot (FP) interferometer for controlling a transmission center wavelength is disclosed in the U.S. Pat. No. 5,062,684 entitled "Optical fiber filter". In this patent, a stabilizing apparatus is not used for external environment such as a temperature variation, etc. by using a FP interferometer in which an optical filter is formed of a ferrul, a support and a piezo-electric device. In the U.S. Pat. No. 5,289,552 entitled "Temperature compensated fiber Fabry-Perot filters", a FP interferometer filter stable for a temperature variation and capable of controlling the transmission wavelength is disclosed. In this patent, the construction of the interferometer is very similar to that in the previous patent. In addition, in this patent, the temperature variation is compensated by changing the position for fixing the optical fiber. In the above-described two patents, the construction of the interferometer is complicated.

In addition, in the U.S. Pat. No. 5,295,205 entitled "Environmentally stable monolithic Mach-Zehnder device", a multiwavelength transmission type interferometer filter using a stable optical fiber Mach-Zehnder interferometer having a small variation of the transmission center wavelength according to the temperature variation is disclosed. In this patent, in order to improve the problem that the transmission center wavelength is varied due to a temperature, the Mach-Zehnder interferometer is formed by inserting two strands of optical fibers into a glass tube. In this patent, the construction is also complicated. In addition, it is impossible to stably control the transmission wavelength.

Namely, since the optical fiber interferometer is sensitive to an external environment such as a temperature variation, a vibration, noise, etc, it should be stabilized for an actual use in the industry.

As a method for stabilizing the interferometer, an active phase tracing method was disclosed. In this method, two outputs of the interferometer are received using two optical detectors for thereby obtaining a difference therebetween and integrating the same, so that an integration signal is obtained. The thusly obtained integration signal is fed to an optical fiber phase modulator(fiber stretcher) formed in one optical path for thereby constantly maintaining the optical path difference of the interferometer.

However, in the above-described active phase tracing method, the interferometer may be stabilized, but it is impossible to continuously control the transmission wavelength.

SUMMARY OF THE INVENTION

Accordingly, it is an object of the present invention to provide an optical fiber Mach-Zehnder interferometer filter which overcomes the aforementioned problems encountered in the conventional art.

It is another object of the present invention to provide an optical fiber Mach-Zehnder interferometer filter which is capable of continuously controlling a transmission wavelength by changing a wavelength of a 1.31 $\mu$m laser diode which is used as a stabilizing light source for an interferometer which is stabilized by an active phase tracing method.

In order to achieve the above objects, there is provided an optical fiber Mach-Zehnder interferometer optical filter which includes a stabilization light source for varying a first wavelength of a light signal for stabilizing a Mach-Zehnder interferometer, first and second optical fiber couplers for receiving an optical signal from the stabilization light source and an optical signal of a second wavelength different from a first wavelength inputted from an input port and dividing into two parts having the same intensity for thereby forming a Mach-Zehnder interferometer, a polarization controller connected with one side of the first optical fiber coupler for controlling a polarization of the interfered light of the interferometer, first and second wavelength division multiplex optical couplers connected with the second optical fiber coupler for separately outputting a first wavelength optical signal and a second wavelength optical signal, an optical fiber phase modulator connected with the other side of the first optical fiber coupler for varying the length of the optical fiber in accordance with a fed-back phase difference, and a stabilization circuit for receiving two optical signals of first wavelength from the first and second wavelength division multiplex optical couplers and feeding back the phase difference to the optical fiber phase modulator for thereby implementing a constant light path difference of the interferometer.

Additional advantages, objects and other features of the invention will be set forth in part in the description which follows and in part will become apparent to those having ordinary skill in the art upon examination of the following or may be learned from practice of the invention The objects and advantages of the invention may be realized and attained as particularly leveled out in the appended claims as a result of the experiment compared to the conventional arts.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The embodiments of the present invention will be explained with reference to the accompanying drawings.

Figure 1:
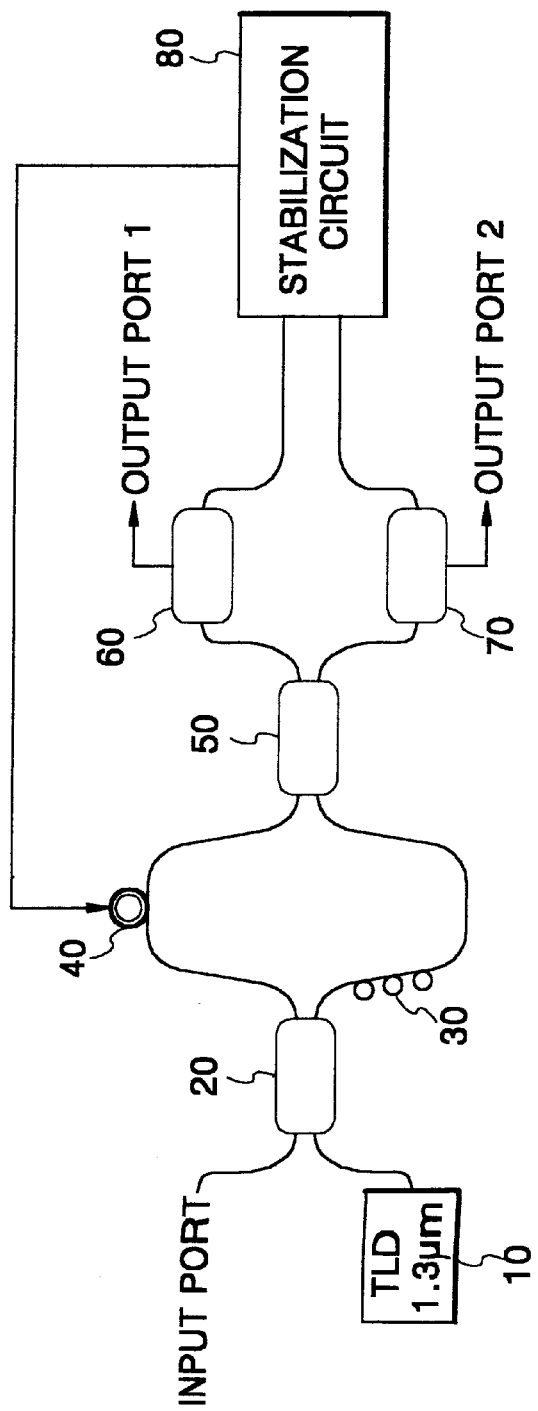
FIG. 1 is a view illustrating a multiwavelength transmission type optical filter using stabilized optical fiber Mach-Zehnder interferometer capable of controlling a transmission wavelength according to the present invention.

FIG. 1 illustrates a stabilized optical fiber Mach-Zehnder interferometer in which a transmission wavelength is controlled according to the present invention.

The optical fiber Mach-Zehnder interferometer filter according to the present invention includes a 1.3 μm wavelength turnable laser diode (TLD) 10 (or DFB-LD (Distributed Feedback laser diode)) for implementing a stabilization of an interferometer, first and second 3 dB optical fiber couplers 20 and 50 having a 50% coupling ratio at 1.5 μm wavelenght band for forming a Mach-Zehnder interferometer, namely, for dividing the intensity of light into two parts, an optical fiber phase modulator(fiber stretcher) 40 connected with two light paths of the interferometer between the first and second optical fiber couplers 20 and 50 for varying the length of the optical fiber, a polarization controller 30 for controlling the polarization of the interfered light, 1.31 μm/1.5 μm wavelength division multiplex optical couplers(WDM coupler) (hereinafter called first and second wavelength division multiplex optical couplers) 60 and 70 connected with the second optical fiber coupler 50 of the interferometer for dividing an optical signal for a filtering and a stabilization light source, and a stabilization circuit 80 for receiving output signals from the first and second wavelength division multiplex optical couplers 60 and 70, obtaining a difference therebetween based on the differential amplifier, integrating the same, feeding-back to the optical fiber phase modulator 40 and obtaining a constant optical path difference of the interferometer. Here, since the detailed embodiments of the stabilization circuit 80 are well known, the description thereon will be omitted.

The operation of the circuit of FIG. 1 will be explained.

The case that the 1.3 μm wavelength tunable laser diode is used as a stabilizing light source will be described as one example of the present invention.

When using the DFB laser diode is used, since the same operation and effects are implemented, the description thereon will be omitted.

First, the first optical fiber coupler(directional coupler) 20 that receives a 1.5 μm broodaband light signal which is incident from an input port and a 1.3 μm wavelength light signal divides the signals into two parts, respectively, having the same light intensity. The thusly divided light signals are transmitted through two light paths of the interferometer and are interfered by the second optical fiber coupler(directional coupler) 50. At this time, the polarization controller 30 connected with the first optical fiber coupler 20 controls the polarization of the interfered light for a good filtering.

In addition, after the interference by the second optical fiber coupler 50, the 1.5 μm wavelength light signal and the 1.3 μm wavelength light signal are coupled and then inputted into the first and second wavelength division multiplex optical couplers 60 and 70. The first and second wavelength division multiplex optical couplers 60 and 70 output a 1.5 μm wavelength light signal to the first and second output ports for a light signal filtering, respectively, and output the 1.3 μm wavelength light signal from the stabilizing light source to the stabilizing circuit 80.

The outputs I(λ) based on the wavelength λ outputted to the first and second output ports may be expressed as follows.

$$I(\lambda) = \frac{I_0(\lambda)}{2}\left[1 \pm \cos\frac{n(\lambda)\lambda_s(2m + 1/2)\pi}{n(\lambda_s)\lambda}\right] \quad \text{[Equation 1]}$$

where $\lambda$ and $\lambda_s$ represent the wavelength of the signal to be filtered and the wavelength of the stabilization light source, $I_o(\lambda)$ represents an input spectrum of 1.5 μm bandwidth, n(λ) and n($\lambda_s$) represent the refractive index of the 1.5 μm and 1.3 μm optical fiber cores, and (2m+½) π represents a phase difference between two light paths of the interferometer fixed by the stabilization circuit 80.

The stabilization circuit 80 receiving two 1.3 μm wavelength light signals from the first and second wavelength division multiplex optical couplers 60 and 70 measures a phase difference between two light paths of the optical fiber interferometer and feeding back to the optical fiber phase modulator 40. The optical fiber phase modulator 40 controls the length of the optical fiber in accordance with the phase difference for thereby obtaining a constant optical path difference between two parts of the optical fiber interferometer.

When changing the wavelength $\lambda_s$ of the wavelength tunable laser diode 10 which is a stabilization light source, the optical path difference of the interferometer is slightly varied, and then the phase of the output of the interferometer is changed based on Equation 1, so that the wavelength transmitted or removed by the filter is changed. At this time, the control accuracy of the wavelength $\lambda$ is determined based on the changing accuracy of the wavelength $\lambda_s$ of the wavelength tunable laser diode 10. One of two methods for varying the wavelength of the stabilization light source is to use a wavelength tunable laser diode and the other of the same is to use the characteristic that the wavelength of the DFB laser diode is changed in accordance with its operating temperature.

Figure 2A:
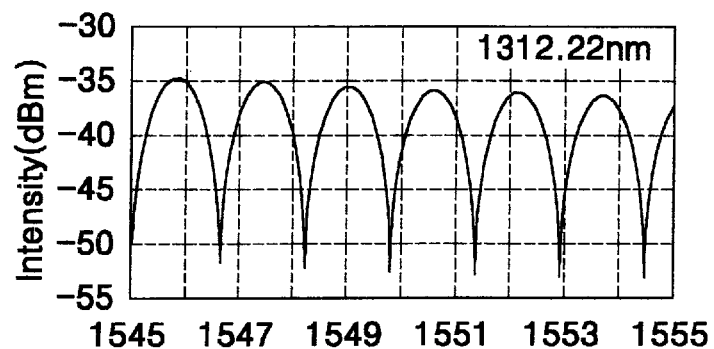
FIGS. 2A through 2C are views illustrating an output spectrum of an interferometer filter based on a wavelength of a stabilized optical source according to the present invention.
Figure 2B:
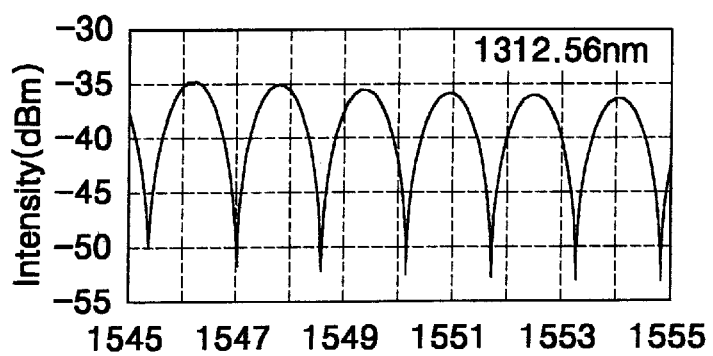
Figure 2C:
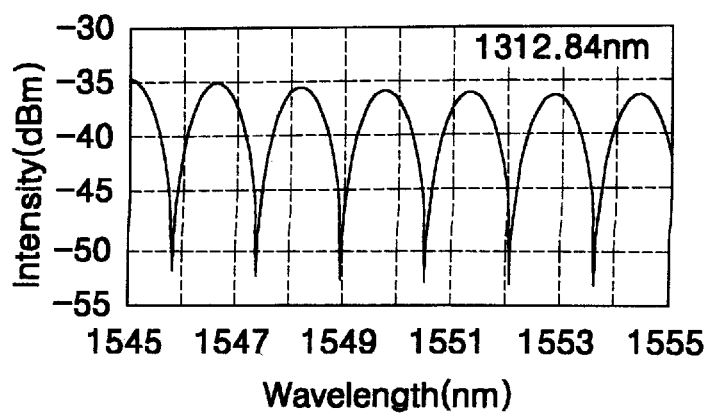

FIGS. 2A through 2C illustrate three examples of output spectra from an interferometer optical filter with a wavelength tunable laser diode as a stabilization light source when an ASE signal from an Erbium-doped fiber amplifier (EDFA) is launched into an input port.

The wavelength of the wavelength tunable laser diode used as a stabilization light source is varied to 1312.22 nm(a), 1312.56 nm(b), and 1312.84 nm(c). At this time, as the wavelength of the stabilization light source is increased, it is known that the transmission wavelength is moved toward a long wavelength region for the reason that as the wavelength of the stabilization light source is increased the phase value of the phase term in Equation 1 is increased. A fine transmission wavelength tuning can be possible by accurate controll of the wavelength of the stabilization light source. Namely, when changing the wavelength of the stabilization light source, the optical path difference of the interferometer is changed, so that the phase of the optical filter output of the interferometer is gradually changed for thereby implementing a continuous control of the transmission wavelength of the optical filter.

As described above, when changing the driving temperature of the DFB laser diode having a single frequency characteristic, the oscillation wavelength is gradually changed. Therefore, it is possible to control a transmission wavelength using the DFB laser diode as a stabilization light source based on the above-described characteristics.

In the present invention, it is possible to stably and continuously control the transmission wavelength of the filter by changing the wavelength of the stabilization light source in the multiwavelength transmission type filter using a stabilized Mach-Zehnder interferometer.

In addition, the present invention may be used as a key element for a WDM optical communication such as an optical filter for multiwavelength channel light source generation, a WDM muxer, a demuxer, etc.

In the present invention, the Mach-Zehnder interferometer is formed of an optical fiber device for thereby implementing a simple construction. In addition, since an independent stabilization light source is used, the present invention may be used for a signal having a discrete or continuous spectrum. In addition, it is possible to continuously change the transmission wavelength and remove external effects such as a temperature, vibration, noise, etc.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. An optical fiber Mach-Zehnder interferometer optical filter, comprising:

a stabilization light source for varying a first wavelength of a light signal for stabilizing a Mach-Zehnder interferometer;

first and second optical fiber couplers for receiving an optical signal from the stabilization light source and an optical signal of a second wavelength different from a first wavelength inputted from an input port and dividing into two parts having the same intensity for thereby forming a Mach-Zehnder interferometer;

a polarization controller connected with one side of the first optical fiber coupler for controlling a polarization of the interfered light of the interferometer;

first and second wavelength division multiplex optical couplers connected with the second optical fiber coupler for separately outputting a first wavelength optical signal and a second wavelength optical signal;

an optical fiber phase modulator connected with the other side of the first optical fiber coupler for varying the length of the optical fiber in accordance with a fed-back phase difference; and a stabilization circuit for receiving two optical signals of the first wavelength from the first and second wavelength division multiplex optical couplers and feeding back the phase difference to the optical fiber phase modulator for thereby implementing a constant light path difference of the interferometer.

2. The filter of claim 1, wherein said stabilization light source is a wavelength tunable laser diode.

3. The filter of claim 1, wherein said stabilization light source is a DFB(Distributed Feedback) laser diode in which a wavelength varies in accordance with a temperature.

4. The filter of claim 1, wherein a light path difference of the interferometer and a transmission wavelength are controlled by controlling the wavelength of the stabilization light source.

* * * * *